United States Patent
Liu et al.

(10) Patent No.: US 10,765,991 B2
(45) Date of Patent: Sep. 8, 2020

(54) RAPID CYCLE PRESSURE SWING ADSORPTION PROCESS AND ADSORBENT LAMINATES FOR USE THEREIN

(71) Applicant: Air Products and Chemicals, Inc., Allentown, PA (US)

(72) Inventors: Jinzhong Liu, Richmond (CA); Wu Li, Victoria (CA); Timothy Christopher Golden, Nantes (FR)

(73) Assignee: Air Products and Chemicals, Inc., Allentown, PA (US)

(*) Notice: Subject to any disclaimer, the term of this patent is extended or adjusted under 35 U.S.C. 154(b) by 76 days.

(21) Appl. No.: 15/673,791

(22) Filed: Aug. 10, 2017

(65) Prior Publication Data

US 2019/0046919 A1 Feb. 14, 2019

(51) Int. Cl.
*B01D 53/047* (2006.01)
*B01D 53/26* (2006.01)

(52) U.S. Cl.
CPC ........ *B01D 53/0473* (2013.01); *B01D 53/261* (2013.01); *B01D 2253/104* (2013.01); *B01D 2253/106* (2013.01); *B01D 2253/108* (2013.01); *B01D 2253/34* (2013.01); *B01D 2257/402* (2013.01); *B01D 2257/504* (2013.01); *B01D 2257/702* (2013.01); *B01D 2257/80* (2013.01); *B01D 2259/40001* (2013.01); *B01D 2259/416* (2013.01)

(58) Field of Classification Search
CPC .. B01D 53/04; B01D 53/047; B01D 53/0473; B01D 53/261; B01D 2253/104; B01D 2253/106; B01D 2253/108; B01D 2253/34; B01D 2257/402; B01D 2257/504; B01D 2257/708; B01D 2257/80; B01D 2259/40001; B01D 2259/416
USPC ............................ 95/96, 117, 129, 139, 143
See application file for complete search history.

(56) References Cited

U.S. PATENT DOCUMENTS

| | | | |
|---|---|---|---|
| 3,899,310 A | 8/1975 | Chi et al. |
| 4,541,851 A | 9/1985 | Bosquain et al. |
| 4,711,645 A | 12/1987 | Kumar et al. |
| 4,801,308 A | 1/1989 | Keefer et al. |
| 5,137,548 A | 8/1992 | Grenier et al. |
| 5,232,474 A | 8/1993 | Jain et al. |
| 5,614,000 A | 3/1997 | Kalbassi et al. |
| 5,656,064 A | 8/1997 | Golden et al. |

(Continued)

FOREIGN PATENT DOCUMENTS

| | | |
|---|---|---|
| DE | 3045451 | 7/1981 |
| EP | 0453202 A1 | 10/1991 |

(Continued)

OTHER PUBLICATIONS

S. Farooq, et al, "Numerical Simulation of a Pressure Swing Adsorption Oxygen Unit", Chemical Engineering Science, 1989, 2809-2816.

(Continued)

*Primary Examiner* — Frank M Lawrence, Jr.
(74) *Attorney, Agent, or Firm* — Matthew R. Weaver

(57) ABSTRACT

A rapid cycle pressure swing adsorption (RCPSA) air purification process, apparatus, and device for the removal of at least one of water, carbon dioxide, nitrous oxide, and one or more hydrocarbons from a feed air stream prior to cryogenic air separation.

12 Claims, 5 Drawing Sheets

(56) References Cited

U.S. PATENT DOCUMENTS

| | | |
|---|---|---|
| 5,769,928 A | 6/1998 | Leavitt |
| 5,779,767 A | 7/1998 | Golden et al. |
| 5,855,650 A | 1/1999 | Kalbassi et al. |
| 5,914,455 A * | 6/1999 | Jain .................... B01D 53/0462 95/106 |
| 6,106,593 A * | 8/2000 | Golden ............. B01D 53/0462 95/120 |
| 6,238,460 B1 * | 5/2001 | Deng .................... B01D 53/02 95/102 |
| 6,379,430 B1 | 4/2002 | Monereau et al. |
| 6,638,340 B1 | 10/2003 | Kanazirev et al. |
| 6,692,626 B2 | 2/2004 | Keefer et al. |
| 7,037,358 B2 | 5/2006 | Babicki et al. |
| 7,115,154 B1 | 10/2006 | Kanazirev et al. |
| 7,300,905 B2 | 11/2007 | Keefer et al. |
| 7,713,333 B2 | 5/2010 | Rege et al. |
| 7,763,098 B2 | 7/2010 | Alizadeh-Khiavi et al. |
| 8,192,526 B2 | 6/2012 | Zhong et al. |
| 8,303,683 B2 | 11/2012 | Boulet et al. |
| 8,734,571 B2 | 5/2014 | Golden et al. |
| 2006/0162556 A1 | 7/2006 | Ackley et al. |
| 2008/0148938 A1 * | 6/2008 | Rege .................... B01D 53/047 95/118 |
| 2010/0300288 A1 * | 12/2010 | Boulet ............... B01D 53/0446 95/96 |
| 2012/0297978 A1 * | 11/2012 | Zhai .................. B01D 53/1493 95/177 |
| 2013/0036904 A1 * | 2/2013 | Zheng ..................... B01J 20/06 95/26 |
| 2014/0338425 A1 * | 11/2014 | Kalbassi ............. B01D 53/047 73/31.07 |

FOREIGN PATENT DOCUMENTS

| | | |
|---|---|---|
| EP | 2826554 A1 | 1/2015 |
| JP | 1983104618 | 6/1980 |
| JP | 1980088823 A | 7/1980 |
| JP | 19922676919 A | 9/1992 |
| JP | 1998155418 A | 6/1998 |
| JP | 2001062238 A | 3/2001 |
| JP | 2002346329 A | 12/2002 |
| JP | 2005501688 A | 1/2005 |
| JP | 2010516452 A | 5/2010 |

OTHER PUBLICATIONS

V. G. Gomes, et al, "Pressure swing adsorption for carbon dioxide sequestration from exhaust gases", Separation Purification Technology, 2002, 161-171.

D. Ko, et al, Optimization of Pressure Swing Adsorption and Fractionated Vacuum Pressure Swing Adsorption Processes for CO2 Sequestration, Presentation at 2004 AIChE Annual Meeting, Austin, TX, Nov. 7-12, 2004.

D. M. Ruthven, "Principles of Adsorption and Adsorption Processes", John Wiley & Sons, Inc., 1984, pp. 209-211 and 242-244.

* cited by examiner

RAPID CYCLE PRESSURE SWING ADSORPTION PROCESS AND ADSORBENT LAMINATES FOR USE THEREIN

FIELD

The following relates generally to a rapid cycle pressure swing adsorption (RCPSA) air purification process and adsorbent laminate sheets for use in said process. In particular, the following relates to an air pre-purification process for the removal of at least one of water, carbon dioxide, nitrous oxide, and one or more hydrocarbons from a feed air stream prior to cryogenic air separation.

BACKGROUND OF THE INVENTION

The cryogenic separation of air requires a pre-purification step for the removal of both high-boiling and hazardous materials. Principal high-boiling air components include water ($H_2O$) and carbon dioxide ($CO_2$). If removal of these impurities from an ambient feed air is not achieved, then $H_2O$ and $CO_2$ will freeze out in cold sections of the separation process, such as heat exchangers and the liquid oxygen (LOX) sump. This can cause pressure drop, flow variations, and also lead to operational problems. In addition, the high boiling hydrocarbons, if not removed, will concentrate in the LOX section of the column to produce flammable mixtures, resulting in a potential explosive hazard. It is also desired that various hazardous materials present in feed air including hydrocarbons such as ethylene, acetylene, butane, propylene and propane be removed prior to introduction to the air separation unit (ASU). Such materials can concentrate within the ASU and form flammable mixtures with oxygen or enriched air.

To avoid accumulation of these impurities in the plant, a certain portion of the liquid oxygen produced must be purged from the system to avoid concentration of these impurities. This purging of liquid oxygen reduces the overall recovery of the plant and lowers possible recovery of other high boiling components like argon, krypton and xenon.

It is also known that oxides of nitrogen should be removed prior to cryogenic separation. A minor air component is nitrous oxide ($N_2O$), which is present in ambient air at about 0.3 ppm. It has similar physical properties to carbon dioxide and therefore presents a potential operation problem because of solids formation in the column and heat exchangers of the cryogenic distillation apparatus. In addition, $N_2O$ is known to enhance combustion of organic materials and is shock sensitive. The removal of $N_2O$ from air prior to cryogenic distillation therefore has a number of advantages. First, it improves the overall safety operation of the air separation unit (ASU). Second, it allows for reduced liquid oxygen purge which improves the plant recovery of oxygen and rare gases. Third, it allows for the use of downflow reboilers, which require high levels of $N_2O$ removal. Downflow reboilers, as opposed to thermosiphon reboilers, are more efficient and lower the overall power required for oxygen production. As such, nitrous oxide also presents a significant safety hazard and thus there is significant interest to remove trace $N_2O$ from air prior to cryogenic distillation.

The pre-purification of air is usually conducted by adsorptive clean-up processes in which contaminating gas components are adsorbed on solid adsorbents with periodic regeneration of the adsorbent. Such processes include pressure swing adsorption (PSA) (U.S. Pat. No. 5,232,474), temperature enhanced pressure swing adsorption (TEPSA) (U.S. Pat. No. 5,614,000), or temperature swing adsorption (TSA) (U.S. Pat. Nos. 4,541,851 and 5,137,548). There is no requirement for regeneration of heat energy in PSA processes as opposed to TEPSA or TSA processes.

When there is sufficient waste gas (purge gas) available in a cryogenic air separation plant, the PSA process is usually a preferred option for air pre-purification due to its simplicity, lower capital cost, and lower operating cost. PSA generally involves coordinated pressure cycling of a gaseous mixture over an adsorbent material. The total pressure is elevated during intervals of flow in a first direction through the adsorption bed, and is reduced during intervals of flow in the reverse direction, during which the adsorbent is regenerated. As the cycle is repeated, the less readily adsorbed component is concentrated in the first direction, while the more readily adsorbed component is concentrated in the reverse direction.

In general, these systems are designed for total $H_2O$ and $CO_2$ removal from ambient air. Typically, these systems are run until $CO_2$ reaches a certain low level of breakthrough (time average 10-100 ppb). So, in most plants, measurement of $CO_2$ breakthrough level is used to ensure reliable operation of the plant (i.e. no operational problems).

U.S. Pat. No. 6,106,593 describes a TSA process that employs a three-layer system consisting of alumina (for $H_2O$ removal), 13X (for $CO_2$ removal) and CaX (for $N_2O$ and hydrocarbon removal). The resulting $N_2O$ removal at 20-50 ppb $CO_2$ time averaged in the air product is 93% as well as removing 100% of inlet ethylene. U.S. Pat. No. 8,734,571 described a PSA process for the removal of $N_2O$ from ambient air in which bed comprising alumina (85%) at the feed end of the bed and 13X zeolite (15%) at the product end of the bed remove only 83% of the inlet $N_2O$ at a $CO_2$ breakthrough level of 50 ppb. It would be of interest to the industry to develop a PSA process where at $CO_2$ breakthrough levels of 20-50 ppb, both $N_2O$ and hydrocarbons are removed.

The adsorbents in the PSA devices do not normally get completely regenerated at the completion of the purge step and hence their dynamic capacity, the ability to remove the desired components, is reduced compared to TEPSA or TSA processes. As a result, the PSA process is typically run for shorter cycle times than TSA or TEPSA thus the bed(s) undergo blow down and re-pressurization at fairly frequent intervals during which the feed gas is vented off. During the blowdown step, there is a noticeable loss of air trapped within the void spaces of the vessel(s) and piping as well as the air adsorbed on the adsorbents. This collective air loss, referred to by various terms such as blowdown loss, vent loss or "switch loss", can represent a significant energy waste as the air is compressed but not utilized for air separation downstream of the pre-purifier. Reducing switch loss can provide significant operating cost savings in terms of reduced compression power.

In PSA processes it is usual to use two adsorbent beds, with one being on-line while the other is regenerated. The depressurization and regeneration of one bed must take place during the short time for which the other bed is on-line, and rapid repressurization can lead to transient variations in the feed and product flows which can adversely affect plant operation.

Much of the existing art focuses on reducing or minimizing the switch loss in a PSA pre-purification process. One method is the use of an adsorbent configuration with a larger proportion of a weak adsorbent such as activated alumina or its modified form which has very low capacity for $O_2$ and $N_2$, and a relatively smaller proportion of the stronger adsorbent such as a molecular sieve for optimized performance (U.S. Pat. Nos. 4,711,645; 5,769,928; 6,379,430 B1 and 5,656,064). Another approach is to reduce the frequency of the blowdown or bed switch loss mentioned above, by optimizing bed layering, using composite adsorbents or purging beds at slightly elevated temperature (U.S. Pat. No. 7,713,333, U.S. Pat. No. 5,855,650). These methods however do not try to reduce the amount of adsorbent used or the size of adsorber vessels. On the contrary, they often result in increased adsorbent inventory.

Conventional PSA pre-purifiers normally operate two adsorbers at cycle times in the order of minutes. For small to medium scale air separation plants, the sizes of the pre-purifier vessels are often too large to fit inside a container. This results in difficulty of shipping, relocating and high cost of installation. It is therefore desirable to reduce the overall footprint of the air pre-purification device.

Reduction in the size and the cost of PSA device, and increase in PSA productivity can be realized by process intensification. One of the common methods of PSA process intensification is to reduce the cycle time of the device. However, an inherent challenge of so-called rapid cycle pressure swing adsorption (RCPSA) systems is that as cycle time decreases, there is a need for faster mass transfer adsorbents.

A number of different adsorbents are known for use in PSA processes. For example, U.S. Pat. No. 5,779,767 describes the use of composite adsorbents comprising a mixture of alumina and zeolite in normal cycle PSA processes for the removal of $CO_2$ and $H_2O$ from an ambient air stream. It has also been demonstrated that activated alumina powder and zeolite powder can be used to form composite adsorbent beads which can be used to purify an air stream in order to remove $H_2O$, $CO_2$ and other impurities including hydrocarbons (see U.S. Pat. Nos. 7,115,154 and 6,638,340).

Typically, improved mass transfer in solid adsorbents is achieved by reducing the particle size (see for example U.S. Pat. No. 5,232,474 and U.S. Pat. No. 8,192,526). The higher mass transfer rate shortens the mass transfer zone, and/or allows the PSA process to run at reduced cycle time. However, the decreased cycle time also results in higher gas velocities in the adsorber which in turn results in a higher pressure drop. The small particles and higher pressure drop will eventually lead to undesirable particle fluidization.

It is also known to use supported adsorbent materials (i.e. laminates) in PSA processes. For example, the use of structured laminate beds for RCPSA processes with ultrashort cycle times has also be been described for $H_2$ purification and $O_2$ vacuum swing adsorption (VSA) applications (U.S. Pat. Nos. 7,300,905, 7,037,358, 7,763,098 and U.S. Pat. No. 8,303,683 B2). In particular, U.S. Pat. No. 7,037, 358 describes supported laminates having a guard layer and an adsorbent layer in RCPSA applications. The guard layer removes contaminants, particularly $H_2O$ from the feed stream before contacting the adsorbent layer.

The effect of cycle time on product purity has been also studied in the existing art. For example, Gomes et al have shown that in a PSA process for the separation of $CO_2$ and $N_2$, as cycle time decreases, the purity of $N_2$ decreases (Separation and Purification Technology, 2002, 28, 2, 161-171). In addition, Farooq et al have investigated the production of $O_2$ from ambient air using PSA both experimentally and with simulations (Chemical Engineering Science, 1989, 44, 12, 2809). The experimental data shows that $O_2$ purity actually goes through a maximum as cycle time decreases and the simulations show that the purity decreases at shorter cycle time.

There remains a need to provide an improved process for the removal of impurities from a feed air stream.

BRIEF SUMMARY OF THE INVENTION

It is an object of the present disclosure to provide an improved process for the removal of impurities including at least one of $H_2O$, $CO_2$, $N_2O$, and hydrocarbons from a feed air stream. It is a further object of the present disclosure to provide a laminate adsorbent that delivers improved mass transfer rate and allows rapid cycle time. It is still a further object of the present disclosure to provide a RCPSA device that has a reduced overall footprint. None of the existing art employs structured laminate beds in an air pre-purification process to remove $H_2O$, $CO_2$ and $N_2O$ from an ambient air steam.

According to a first aspect of the present disclosure, there is provided a process for removing at least one impurity selected from the group consisting of $H_2O$, $CO_2$, $N_2O$, and one or more hydrocarbons from a feed air stream comprising said at least one impurity, wherein said at least one impurity is removed by RCPSA.

The inventors have found that the process of the first aspect of the present disclosure advantageously reduces switch loss, reduces pressure drop, increases productivity and provides very low $CO_2$ breakthrough levels at very fast cycle times. Surprisingly, the inventors have discovered that as the cycle time (and contact time) decreases, the purity of the weakly adsorbed product (air) improves. In addition, the process according to at least one aspect delivers a higher removal rate for $N_2O$ and hydrocarbons when compared with conventional longer cycle time PSA process.

In at least one aspect, there is provided a process primarily intended for the purification of air by removing at least one impurity selected from the group consisting of $H_2O$, $CO_2$, $N_2O$, and one or more hydrocarbons from a feed air stream. The purified air is then suitable as a feed to an ASU.

Thus, according to a second aspect of the present disclosure, there is provided a process for separating air by cryogenic separation, said process comprising the steps of:
  passing a feed air stream through at least one RCPSA device to remove at least one impurity selected from the group consisting of $H_2O$, $CO_2$, $N_2O$, and one or more hydrocarbons from said feed air stream to produce purified air; and
  feeding said purified air to a cryogenic distillation column system to separate said purified air into oxygen and/or nitrogen products.

One of the main challenges associated with RCPSA systems is that as cycle time decreases, there is a need for faster mass transfer adsorbents.

Thus, according to a third aspect of the present disclosure, there is provided an adsorbent laminate sheet (composite adsorbent laminate) for use in RCPSA processes, said sheet comprising a support material coated with a composition comprising an adsorbent component and a binder; wherein said adsorbent component comprises a mixture of a zeolite and at least one of alumina, a surface-treated alumina, and a silica gel.

The inventors have found that when composite laminates according to embodiments of the present are employed in a RCPSA process for air pre-purification, one or more of the following advantages are observed: reduced switch loss; reduced pressure drop; increased productivity; reduced cycle times; and reduced contact time during feed.

According to a fourth aspect of the present disclosure, there is provided a method of forming an adsorbent laminate sheet for use in RCPSA processes, said method comprising the steps of:

providing a support material;

forming a slurry comprising an adsorbent component and a binder;

coating said support material with said slurry; and drying said slurry to form said absorbent laminate sheet;

wherein said adsorbent component comprises a mixture of a zeolite and at least one of alumina, a surface-treated alumina, and a silica gel.

According to a fifth aspect of the present disclosure, there is provided a RCPSA device for removing at least one impurity selected from the group consisting of $H_2O$, $CO_2$, $N_2O$, and one or more hydrocarbons from a feed air stream comprising said at least one impurity; said device comprising at least two adsorber elements in parallel;

wherein each said adsorber element comprises at least one adsorbent laminate sheet, said sheet comprising a support material coated with a composition comprising an adsorbent component and a binder;

wherein said adsorbent component comprises a mixture of a zeolite and at least one of alumina, a surface-treated alumina, and a silica gel.

According to a sixth aspect of the present disclosure, there is provided an apparatus for separating air by cryogenic separation, said apparatus comprising:

at least one RCPSA device for removing at least one impurity selected from the group consisting of $H_2O$, $CO_2$, $N_2O$, and one or more hydrocarbons from a feed air stream to produce purified air, said device comprising at least two adsorber elements in parallel; and a cryogenic distillation column system for separating said purified air into oxygen and/or nitrogen products;

wherein each said adsorber element comprises at least one adsorbent laminate sheet, said sheet comprising a support material coated with a composition comprising an adsorbent component and a binder;

wherein said adsorbent component comprises a mixture of a zeolite and at least one of alumina, a surface-treated alumina, and a silica gel.

The cryogenic distillation column system is preferably a nitrogen generator or an oxygen generator.

According to a seventh aspect of the present disclosure, there is provided a use of a rapid cycle pressure swing adsorption (RCPSA) device according to a fifth aspect of the present disclosure for pre-purification of air by removing at least one impurity selected from the group consisting of $H_2O$, $CO_2$, $N_2O$, and one or more hydrocarbons from a feed air stream comprising said at least one impurity.

BRIEF DESCRIPTION OF SEVERAL VIEWS OF THE DRAWINGS

A number of preferred embodiments of the present disclosure will now be described with reference to the drawings, in which.

DETAILED DESCRIPTION OF THE INVENTION

Figure 1:
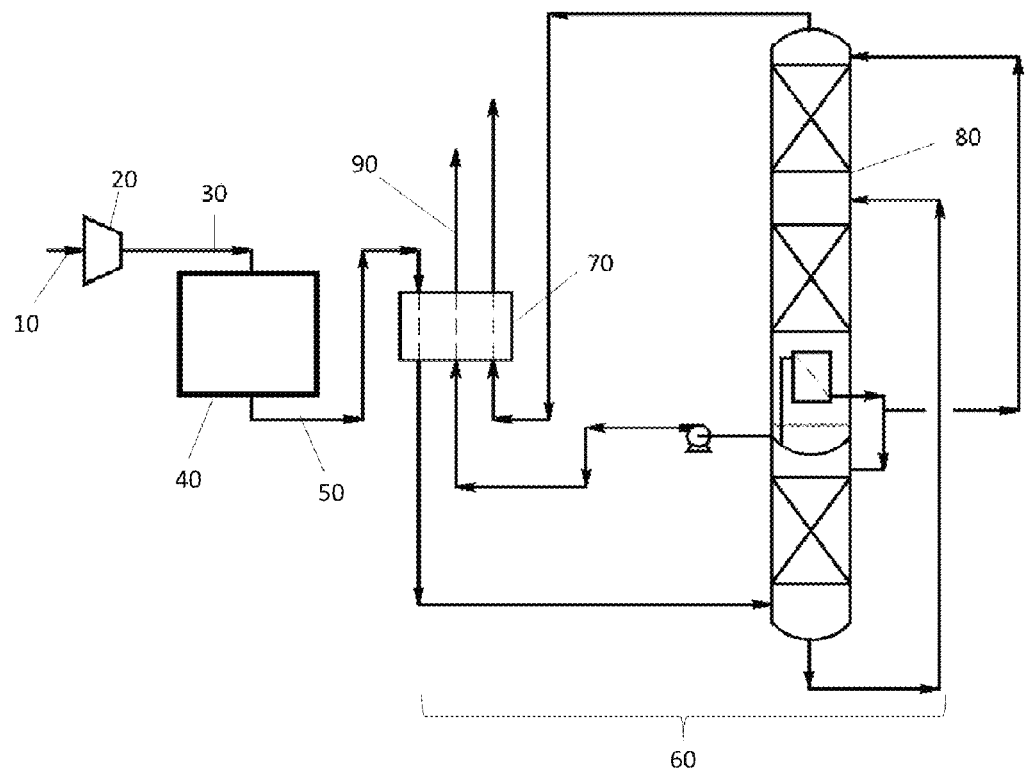
FIG. 1 is a schematic representation of an air separation process according to the second aspect of the present disclosure.

In this specification, unless expressly otherwise indicated, the word 'or' is used in the sense of an operator that returns a true value when either or both of the stated conditions are met, as opposed to the operator 'exclusive or' which requires only that one of the conditions is met. The word 'comprising' is used in the sense of 'including' rather than to mean 'consisting of'. All prior teachings above are hereby incorporated herein by reference.

The following terms used in the specification are defined as follows:

"switch loss" is a term of the art used to refer to the feed gas in the bed that is vented off and lost during depressurization.

"$CO_2$ breakthrough" refers to the average exit concentration of $CO_2$ which exits the bed during the feed step.

"support material" refers to any material to which or about which adsorbent material is applied to form an adsorbent laminate structure.

"laminate" refers to a structure formed from a support and at least one adsorbent material, and perhaps other materials, such as catalysts, over, about or through which a mixture of gasses can be flowed for gas adsorption, separation and/or a gas phase chemical reaction.

"composite" refers to at least two adsorbent materials in intimate contact in the particle level and bound together in a substantially homogenous mixture.

"composite laminate" refers to a laminate substantially containing composite adsorbents with at least two adsorbents bound to the laminate, where adsorbents are substantially uniformly distributed.

"adsorber element" refers to a structure formed from plural laminates, or from an elongate laminate, such as a spirally wound laminate.

"PSA Apparatus" is a term of the art and refers to an apparatus that contains a process fluid and at least one adsorber material and enables a PSA process to occur with the process fluid and the at least one adsorber.

In at least one aspect, there is provided a RCPSA process for air pre-purification which removes at least one of $H_2O$, $CO_2$, $N_2O$, and one or more hydrocarbons from a feed air stream comprising said impurities.

The process of the present disclosure preferably has a cycle time from about 0.3 to about 60 seconds, more preferably from about 1 to about 45 seconds, more preferably from about 1 to 30 seconds, most preferably from about 1 to about 15 seconds. The cycle time is the sum of the various process steps required to complete one adsorption cycle. In each adsorption cycle, the adsorbent is subjected to a feed period in which adsorption takes place, followed by depressurization, regeneration and repressurization. Standard (long cycle) PSA processes typically operate at cycle times in the range of 20 to 50 minutes, corresponding to 0.02-0.05 cycles per minute (CPM). Advantageously, the process of the present disclosure delivers a total air recovery of at least 97%, despite very short cycle times.

Preferably, the process of the present disclosure has a contact time on feed of about 1 second or less, preferably about 0.5 seconds or less. Typical PSA cycles for air pre-purification have a contact time on feed of about 10-20 seconds. Contact time on feed (or residence time) is defined as the duration of time that the feed gas spends in the beds during the feed step. The contact time is calculated by dividing the bed length with the gas linear space velocity (cm/cm/sec). Alternatively, it can be calculated by dividing the bed volume by the actual volumetric flow rate ($m^3/m^3$/sec). The inventors have found that at contact time of about 1 second or less, the bed size can be reduced and higher productivities obtained. Surprisingly, it has been found that short contact times result in high air purity, i.e. increased removal of impurities from the feed air stream.

A shorter cycle time in a PSA process is typically associated with a higher switch loss. However, the use of a significantly shorter cycle time allows for additional pressure equalization steps, which in turn helps to reduce switch loss despite the need for more frequent depressurization steps due to the shorter cycle time. In preferred embodiments, the process of the present disclosure comprises at least two pressure equalization steps per cycle. A pressure equalization step is when a high pressure bed (i.e. a bed at the end of the feed) gives gas to a lower pressure bed (i.e. a bed at the end of regeneration). The effect of this step is to save air that was compressed and help to improve the overall air recovery of the process.

The feed air stream comprises at least one impurity selected from $H_2O$, $CO_2$, $N_2O$, and one or more hydrocarbons. Possible hydrocarbons include, but are not limited to acetylene ($C_2H_2$), ethylene ($C_2H_4$), and also hydrocarbons containing 3 or more carbon atoms, for example, propylene ($C_3H_6$) and butylene ($C_4H_8$). It is preferred that the one or more hydrocarbons comprise at least one of $C_2H_2$ or $C_2H_4$.

Preferably, the feed air stream comprises $H_2O$, $CO_2$ and $N_2O$ impurities and the process of the present disclosure removes these impurities from the feed air stream. Advantageously, the process of the present disclosure removes at least 99% of $H_2O$ and $CO_2$ from the feed air steam and/or at least 90% of $N_2O$ from the feed air stream. Current normal (long) cycle PSA processes have a maximum $N_2O$ removal of 83%.

Preferably, the process of the present disclosure removes one or more hydrocarbon impurities from the feed air stream. For example, the process of the present disclosure may remove one or more hydrocarbons and at least one of $H_2O$, $CO_2$ and $N_2O$ from a feed air stream comprising one or more hydrocarbons and at least one of $H_2O$, $CO_2$ and $N_2O$. Advantageously, the process of the present disclosure removes at least 90% of hydrocarbon impurities, preferably at least 99%, more preferably 100% from the feed air stream.

The process of the present disclosure preferably provides a $CO_2$ breakthrough level of at least about 10 ppb. The $CO_2$ breakthrough level is preferably less than about 100 ppb. $CO_2$ breakthrough levels are measured in PSA plants in order to ensure safe operation of the plant. If the $CO_2$ breakthrough level is controlled to a specific level, it can be ensured that other impurities are also removed. A $CO_2$ breakthrough level of at least about 10 ppb ensures safe operation of the PSA device, whilst still obtaining an acceptable productivity. If the $CO_2$ breakthrough level is less than 10 ppb, although the operation of the plant is safe, the productivity of the plant is small. Conversely, at a $CO_2$ breakthrough level of 300 ppb, the productivity is improved, but the feed rate is too high, causing breakthrough of a key impurity.

In the process according to the present disclosure, the linear velocity of the feed gas must be increased above that in a normal (long) cycle PSA process. The linear velocity of the feed air is preferably at least about 0.5 m/s to less than about 3 m/s, more preferably at least about 2 m/s to less than about 3 m/s. This is about 5 times higher than that of a normal cycle PSA process.

The process according to the present disclosure preferably has a purge to air (P/A) ratio on a molar basis of at least about 0.3, a feed pressure in the range of from about 4 to about 20 bar, and/or a feed temperature in the range of from 0 to about 50° C.

The present disclosure also provides a process for separating air by cryogenic distillation into oxygen and/or nitrogen products (FIG. 1). The first step of the process is to compress the feed air stream 10 to a desired pressure in compressor 20. The compressed air 30 is then passed through at least one RCPSA device 40 to remove at least one impurity selected from the group consisting of $H_2O$, $CO_2$, $N_2O$, and one or more hydrocarbons from said feed air to produce a purified air stream 50. The purified air stream 50 is then fed into a cryogenic distillation column system 60 comprising a main heat exchanger 70 and a distillation column 80, and the purified air is separated into at least oxygen and/or nitrogen products 90.

To keep the flow to the ASU constant during bed switches the main air compressor must increase its flow during the repressurization step. For a two-bed long cycle PSA process having a total cycle time of 28 minutes to produce 1000 $Nm^3/h$ of clean dry air, the maximum increase in compressor flow required to repressurize the off-stream bed is 16%. This means that the compressor flow during repressurization is 16% higher than the base flow required to supply the required flow of clean, dry air.

The process of the present disclosure advantageously requires an increase in compressor flow of less than about 10% in the feed preferably less than about 7%. This means that the compressor flow during repressurization is less than about 10% higher than the base flow required to supply the required flow of clean, dry air to the ASU. This is because the total bed volume is very small and even though the beds switch frequently, the flow variations are dampened out in the piping system of the PSA. This helps to keep flow variations to a minimum and therefore helps keep the flow from the compressor more constant and results in less wear and tear of the compressor. Non-constant air flow impairs the smooth operation of the cryogenic distillation column system.

Figure 2:
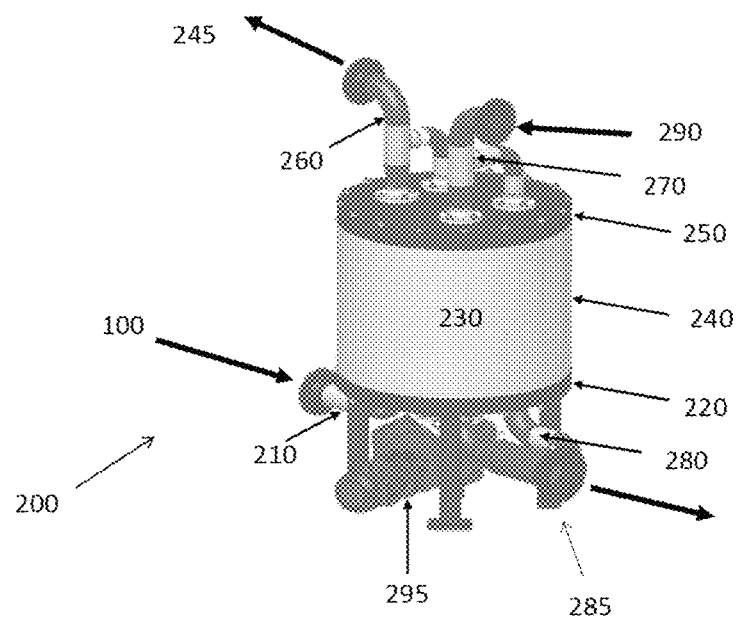
FIG. 2 is a schematic 3-D drawing of a RCPSA device which can be employed in the processes according to the first and second aspects of the present disclosure.

The process according to the present disclosure may employ any RCPSA device known in the art. FIG. 2 shows a typical RCPSA device. Feed air 100 from an upstream main air compressor enters the device 200 through feed inlet pipe 210. The feed air then flows through a feed rotary valve assembly 220 to reach RCPSA adsorbent beds 230 contained inside the enclosure 240. When the feed air reaches the top end of the beds the impurities are removed to produce treated air stream 245. The treated air stream then passes through a product rotary valve assembly 250 and product pipe spool 260 to leave the device.

The regeneration gas for a RCPSA device (normally the waste gas from a cryogenic distillation system) enters the RCPSA device through inlet pipe spool 270, flows through rotary valve assembly 250, adsorbent beds 230 and exits the device through feed rotary valve assembly 220 and outlet 280 before being vented into the atmosphere through vent 285. The regeneration gas 290 cleans up the adsorbent beds for the next adsorption cycle. In this configuration, the adsorbent beds rotate against the rotary valve. The rotation is achieved by a drive train powered by an electric motor 290.

Figures 3A, 3B:
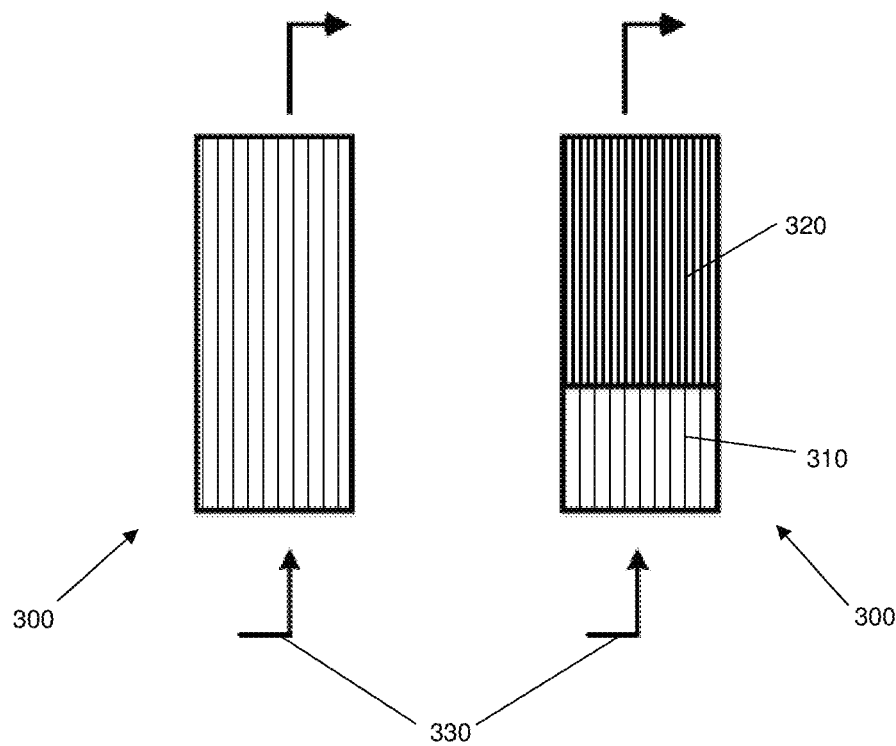
FIGS. 3A and 3B are schematic representations of two alternative embodiments of an adsorber element for use in an RCPSA device employed in the process according to the first aspect of the present disclosure.

FIGS. 3A and 3B show two alternative configurations of an adsorber element 300 for use in a RCPSA device that can be used in the processes according the first and second aspects of the present disclosure.

FIG. 3A shows an adsorber element 300 having a single layer configuration. The adsorber element comprises a composite laminate according to a third aspect of the present invention or a laminate comprising activated alumina or a surface-treated alumina (e.g. alumina impregnated with basic salts as described in U.S. Pat. No. 5,656,064).

FIG. 3B shows an adsorber element 300 have a first layer 310 and a second layer 320. The first layer comprises at least one laminate comprising activated alumina, a surface-treated alumina or a silica gel. The primary function of the first layer is to remove $H_2O$ from the feed air stream 330. The second layer may comprise a laminate comprising a zeolite (e.g. 13X) or a composite laminate according to the third aspect of the present disclosure. The primary function of the second layer is to remove $CO_2$ and $N_2O$.

In alternative embodiment, the adsorber element may comprise three layers. For example, a first layer comprising an activated alumina, a second layer comprising a zeolite or a composite laminate according to a third aspect of the present invention, and a third layer comprising a zeolite.

Preferably, the process of the invention employs a RCPSA device according to the sixth aspect of the present invention comprising at least two adsorber elements in parallel, preferably at least four adsorber elements. Each adsorber element comprises at least one adsorbent laminate sheet (composite laminate) comprising a support material coated with a composition comprising an adsorbent component and a binder.

Preferably, each adsorbent laminate sheet is spirally wound. In an alternative embodiment, the adsorbent laminate sheets can be stacked to form a laminate stack (see U.S. Pat. No. 4,801,308). Spacers can be placed between adjacent adsorbent laminate sheets to establish the gap height between adjacent laminate sheets and thus define flow channels between each pair of adjacent sheets. Suitable spacers include, but are not limited to metal mesh spacers and printed spacers.

The adsorber elements preferably have a length in the range of from about 15 cm to about 60 cm, more preferably from about 20 cm to about 50 cm, most preferably from about 25 cm to about 40 cm.

The adsorber elements preferably have a diameter in the range of from about 2 cm to about 40 cm, more preferably from about 10 cm to about 30 cm.

Any material to which the disclosed slurries can be applied to form a laminate can be used as a support material. The support material provides physical strength to the adsorbent laminate sheet and must have sufficient physical strength to hold the laminate strong enough during application as well as the flexibility to be spirally wound. The support material must also be capable of dissipating local heat and must be able to withstand a high activation temperature of about 350° C. Examples of suitable support materials include, but are not limited to, metal foil; expanded metal foil; embossed metal foil; ceramic or composite mesh; metal mesh; corrugated metal sheet; glass fiber fabric or scrim; carbon fiber fabric; cellulosic fabric or scrim; polymeric mesh, fabric or scrim; or combinations thereof. A particularly preferred support material is stainless steel woven mesh.

The adsorbent component comprises a mixture of a zeolite and at least one of alumina, a surface-treated alumina as described in U.S. Pat. No. 5,656,064, and a silica gel. Preferred aluminas include activated alumina (AA) and high surface area transitional alumina. Preferred zeolites include 13X, NaY, NaLSX, A, chabazite, and silicalite. Particularly preferred zeolites include 13X and NaY. It is preferred that the adsorbent component comprises a mixture of alumina and a zeolite.

The ratio of alumina, surface-treated alumina and/or silica gel to zeolite in the mixture is preferably in the range of from about 100:1 to about 1:100, more preferably about 9:1 to about 1:9, more preferably about 8:2 to about 2:8, and most preferably about 7:3 to about 3:7.

The thickness of the adsorbent laminate sheet of the present invention depends on a number of factors including substrate thickness, the coating process, and the intended application. This thickness is typically much smaller than the nominal particle diameter of conventional adsorbent beads or pellets. The adsorbent laminate sheet of the present invention preferably has a thickness in the range of from about 0.01 mm to about 0.3 mm, more preferably from about 0.05 mm to about 0.25 mm, more preferably from about 0.1 mm to about 0.2 mm, and most preferably from about 0.1 mm to about 0.175 mm.

A high laminate thickness is typically associated with the presence of a higher proportion of more adsorbent materials in the laminate. The laminate thickness is selected to balance the increase in thickness due to a higher proportion of more adsorbent materials and reducing thickness (or increasing the surface void) for better mass transfer and lower pressure drop of the bed. The surface void is the vacant space within the measured thickness adjacent the laminate surface.

The adsorbent laminate sheet of the present invention preferably has a laminate adsorbent loading (per laminate area) in the range of from about 10 $g/m^2$ to about 170 $g/m^2$, more preferably from about 30 $g/m^2$ to about 130 $g/m^2$, more preferably from about 50 $g/m^2$ to about 90 $g/m^2$, most preferably from about 40 $g/m^2$ to about 90 $g/m^2$. The adsorbent loading is the weight of adsorbent per laminate area and is based on the weight of an adsorbent on a dry basis.

The adsorbent laminate sheet of the present invention preferably has a laminate adsorbent density in the range of from about 0.08 $g/cm^3$ to about 0.95 $g/cm^3$, more preferably from about 0.15 $g/cm^3$ to about 0.6 $g/cm^3$. The adsorbent density is the weight of adsorbent per volume of the laminate. The volume of the laminate includes the mesh and/or substrate volume, adsorbent and additives volume, and internal void volume and surface void volume. The adsorbent loading and the adsorbent density are impacted by the type of substrate or metal mesh being coated, the laminate thickness and the surface void in the final laminate sheet.

The adsorbent laminate sheet of the present invention is preferably formed by the method described herein. The method generally involves forming a slurry comprising the adsorbent component and a binder. The slurry can be water based, organic based, or an aqueous mixture comprising organic materials. The materials are mixed together in a dispersing equipment such as a high shear mixer, a ball mill or attritor mill to form a slurry. The milling or mixing process may or may not change or reduce the size of the adsorbent particles. The slurry is preferably a free flowing liquid with a proper viscosity suitable for the selected coating process. The viscosity is typically in the range between about 50 mPa·s to about 2000 mPa·s. The viscosity is chosen dependent on the coating process.

The selection of the binder may depend on the particular adsorbent material selected, which in turn depends upon the task that devices comprising adsorbent laminates perform. Suitable binders include, but are not limited to, colloidal silica, colloidal zirconia, colloidal alumina, organic binders such as phenolic resins, amorphous silicon dioxide particles having a particle size ranging from about 1 to about 100 nanometers, and mixtures thereof.

The slurry may optionally further comprise one or more additives to improve the adhesive and coating properties of the slurry. Preferred additives include, but are not limited to, polyvinyl alcohol, methyl cellulose, polyethylene glycol, hydrous magnesium aluminum-silicate (e.g. Acti-gel®), xantham gum, or mixtures thereof.

The slurry may also optionally further comprises one or more dispersion agents preferably selected from ionic surfactants and non-ionic surfactants. The role of the dispersion agent is to properly and uniformly disperse the adsorbent powders in the liquid to form a homogeneous slurry. Suitable dispersion agents include, but are not limited to, nonylphenol ethoxylate, glycolic acid ethoxylate lauryl ether, sodium polymethacrylate, acetylene glycol derivatives (e.g. Surfynol® 104PA surfactant), or mixtures thereof.

The adsorbent laminate sheet is made by applying the slurry to the support material and then drying at a temperature typically below about 100° C. The slurry may be applied to one or both sides of the support material. Various coating processes may be used to apply the slurry to the laminate support material(s) to form the composite adsorbent laminate. Suitable coating process include doctor blade, dip coat, and roll coat processes.

EXAMPLES

Materials
A300 alumina powder (available from UOP): activated alumina (AA) powder, active ingredient on a dry basis of 94.5%.
Actigel® 208: hydrous magnesium aluminum-silicate, active ingredient on a dry basis of 81%.
Coatex® DV 592: Polycarboxylate in an aqueous solution.
IGEPAL® CO-630: Polyoxyethylene (9) nonylphenylether non-ionic surfactant, 5.0% by weight active ingredient.
SNOWTEX® ST-40 (available from Nissan Chemicals): colloidal silica.
SNOWTEX® ST-XS (available from Nissan Chemicals): colloidal silica.
13X zeolite powder (available from UOP), active ingredient on a dry basis 74.8%.
NaY zeolite powder (available from Luoyang Jianlong).
Composite Laminates 1-4 and Comparative Laminates 1-2

A typical method for preparing a slurry composition is described below for Laminate Example 1 a.

A slurry composition was prepared by adding deionized water (71.36 g), 13X zeolite powder (21.30 g), A300 (68.42 g), Acti-gel® 208 powder (0.56 g), ST-40 colloidal silica (8.87 g), ST-XS colloidal silica (25.96 g), Coatex DV 592 (3.15 gram) and IGEPAL® CO-630 (0.4 g) to a high shear mixer. The ingredients were mixed to obtain a homogeneous slurry having a viscosity about 100 mPa·s. The ratio of AA:13X in the slurry was 80:20.

Various slurries were made with alumina and zeolite powders in the ratios shown below in Table 1.

The resulting slurries were used to coat a stainless steel metal mesh and dried at a temperature of 100° C. to form an adsorbent laminate sheet. The laminate adsorbent loading, laminate adsorbent density and laminate thickness were measured for each adsorbent laminate sheet.

The laminate adsorbent loading is the laminate adsorbent weight divided by the laminate area. The laminate adsorbent weight was calculated by measuring the total weight of the laminate after drying in an oven at 500° C. for 30 minutes and subtracting the weight of stainless steel metal mesh weight and the binder content weight. The laminate area was measure using a ruler. The laminate adsorbent density is the laminate adsorbent weight divided by the laminate volume (laminate thickness multiplied by the laminate area). Laminate thickness was measured using a micrometer.

The results are summarized in Table 1.

TABLE 1

| Example | Alumina | Zeolite | Ratio alumina:zeolite (dry weight basis) | Laminate adsorbent loading (g/m$^2$) | Laminate adsorbent density (g/cm$^3$) | Laminate thickness (mm) |
| --- | --- | --- | --- | --- | --- | --- |
| Composite Laminate 1a | A300 Powder | 13X | 80:20 | 97.6 | 0.339 | 0.29 |
| Composite Laminate 1b | A300 Powder | 13X | 80:20 | 76.7 | 0.47 | 0.163 |
| Composite Laminate 1c | A300 Powder | 13X | 80:20 | 97.2 | 0.559 | 0.175 |
| Composite Laminate 2a | A300 Powder | 13X | 60:40 | 79.9 | 0.496 | 0.160 |
| Composite Laminate 2b | A300 Powder | 13X | 60:40 | 69.2 | 0.428 | 0.163 |
| Composite Laminate 2c | A300 Powder | 13X | 60:40 | 63.9 | 0.398 | 0.160 |

TABLE 1-continued

| Example | Alumina | Zeolite | Ratio alumina:zeolite (dry weight basis) | Laminate adsorbent loading (g/m$^2$) | Laminate adsorbent density (g/cm$^3$) | Laminate thickness (mm) |
|---|---|---|---|---|---|---|
| Composite Laminate 3 | A300 Powder | 13X | 70:30 | 72.4 | 0.458 | 0.160 |
| Composite Laminate 4 | A300 Powder | NaY | 50:50 | 118.6 | 0.547 | 0.217 |
| Comparative Laminate 1a | — | 13X | 0:100 | 139.4 | 0.551 | 0.254 |
| Comparative Laminate 1b | — | 13X | 0:100 | 53.3 | 0.347 | 0.152 |
| Comparative Laminate 1b | — | 13X | 0:100 | 84.3 | 0.483 | 0.173 |
| Comparative Laminate 2a | A300 Powder | — | 100:0 | 131 | 0.441 | 0.297 |
| Comparative Laminate 2b | A300 Powder | — | 100:0 | 103 | 0.581 | 0.178 |
| Comparative Laminate 2c | A300 Powder | — | 100:0 | 80.0 | 0.487 | 0.165 |

The data in Table 1 demonstrates that composite adsorbent laminates in accordance with the third aspect of the present invention can be prepared having various alumina:zeolite ratios, laminate thicknesses, laminate adsorbent loadings and laminate adsorbent densities (Composite Laminates 1-4). All of these composite laminates can be applied in the RCPSA air pre-purification process in accordance with the first aspect of the present invention.

The Comparative Laminates comprise a single adsorbent and have also been prepared with varying thicknesses, adsorbent loadings and adsorbent densities.

Breakthrough Tests

For equilibrium-controlled PSA processes, the thermodynamic (equilibrium) separation performance may be negatively affected by mass transfer resistances including pore diffusional resistance and axial dispersion. The diffusional mass transfer resistance can be considered by three major mechanisms for an adsorption process: external film, micropore and macropore resistances. For an air separation process, film and micropore resistance can generally be ignored for adsorbents used (such as zeolites, AA or silica gel in the form of beads, pellets or laminate sheets). The overall mass transfer resistance $MTC_{tot}$ (gas phase based) can be calculated according to Equation 1 below.

$$\frac{1}{MTC_{Tot}} = \frac{1}{MTC_{DL}} + \frac{1}{MTC_{DP}} = \frac{D_L}{v^2}\left(\frac{1-\varepsilon}{\varepsilon}\right) + \frac{R_P^2}{15\varepsilon_P D_P} \quad (Eq.\ 1)$$

Figure 7:
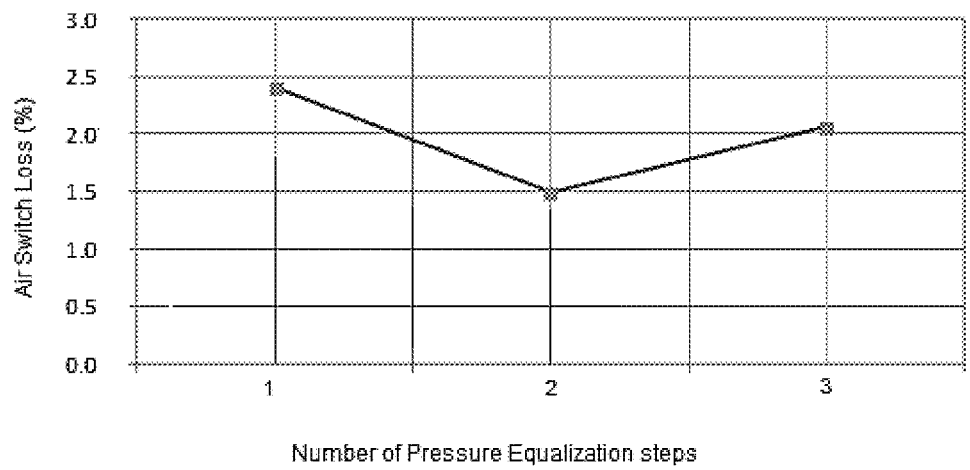
FIG. 7 is a graph depicting the effect of the number of top equalization steps on switch loss and productivity for an activated alumina bed.

$D_L$ can be calculated according to Equations 7.9 and FIG. 7.4 in D. M. Ruthven, Principles of Adsorption and Adsorption Processes, Wiley-Interscience, 1984 at pages 209-211 and 242-244. The evaluation of $MTC_{tot}$ is similar as in prior art U.S. Pat. No. 8,192,526 for fine adsorbent beads or pellets.

$$\frac{1}{MTC_{DL}}$$

is calculated by the first term, $$\frac{D_L}{v^2}\left(\frac{1-\varepsilon}{\varepsilon}\right).$$

The second term, $$\frac{R_P^2}{15\varepsilon_P D_P}$$

is used to calculate $$\frac{1}{MTC_{DP}}.$$

Taking advantage of the low pressure drop of the laminate structure, the person skilled in the art would be able to calculate the expected overall mass transfer resistance of laminate adsorbent structure using Equation 1 above derived for fine beads but assuming the laminate sheet thickness to be equal of particle diameter (2XRP). The calculated overall mass transfer resistance can be used to estimate the RCPSA performance for air pre-purification processes, normally with the help of a process simulator.

Breakthrough tests were conducted for two different test beds.

Bed 1: Commercially available PS201 composite adsorbent beads (~80 wt % AA and 20 wt % 13X), 2 mm diameter.

Bed 2: Laminate Example 1 b (80 wt % AA and 20 wt % 13X powder), 0.162 mm thickness.

Both beds were tested at a pressure of 1.4 bara using $CO_2$ in inert gas (Helium) as the test gas. A feed gas with a known concentration of $CO_2$ was passed over the adsorbent bed.

Bed 1 was tested under breakthrough test conditions at a flow rate (velocity) of 0.14 m/s. Bed 2 was tested under breakthrough test conditions at a low flow rate of 0.04 m/s and also a higher flow rate of 2 m/s. The high velocity breakthrough test conditions correspond to the regeneration step conditions of an actual RCPSA device.

The outlet $CO_2$ concentration until the outlet and inlet $CO_2$ concentrations were the same (full breakthrough) and a breakthrough time with $CO_2$ concentration plotted against time was produced.

The overall mass transfer coefficient (MTC) value was extracted by using an ASPEN process simulator by matching all the test parameters and varying only the overall mass transfer coefficient to fit the breakthrough concentration profile. The best fit value ($MTC_{DS2}$) was determined for each bed.

Using the best fit value of the 2 mm beads, the overall mass transfer resistance was estimated for beads having a diameter of 0.162 mm using Equation 1 above ($MTC_{DS1}$).

As can be seen from the data in Table 2, the experimental (best-fit) overall mass transfer coefficient ($MTC_{DS2}$) for the 0.162 mm laminate sheet was about 3.1 times than the value calculated for 0.162 mm adsorbent beads of the same diameter as the laminate sheet thickness under low velocity breakthrough test conditions, and 1.9 times the value calculated for 0.162 mm adsorbent beads under high velocity breakthrough test conditions.

This data therefore shows that the gas uptake rate (mass transfer) of a 0.162 mm adsorbent laminate bed (Bed 2) is faster than would be expected by extrapolation of breakthrough test data for 2 mm composite adsorbent beads. This faster mass transfer leads to unexpectedly higher productivity.

Figure 6:
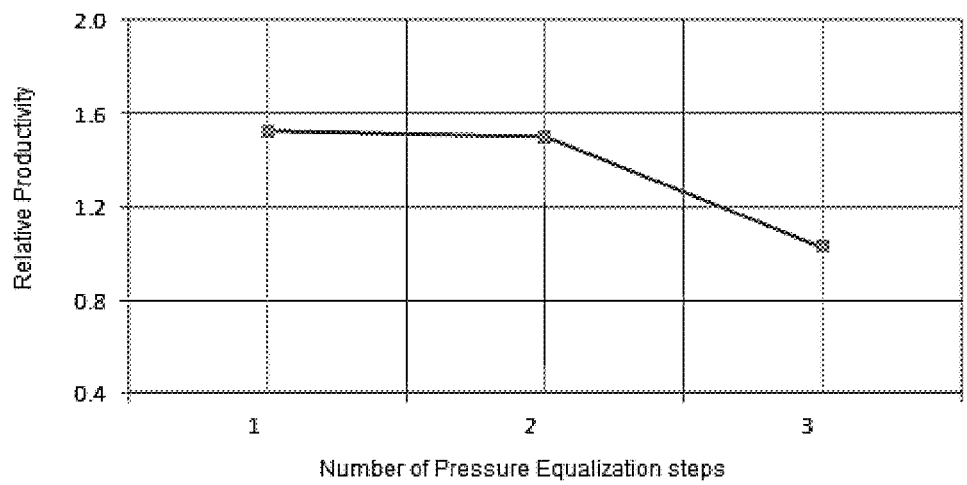
FIG. 6 is a graph depicting the effect of the number of pressure equalization steps on productivity for an activated alumina bed.

Three cycles differing in the number of top equalization steps were compared. It can be seen from the graph in FIG. 6 that the productivity obtained using a cycle with two top equalization steps is only slightly lower than that obtained using a cycle with one equalization step. In addition, the graph in FIG. 7 shows that switch loss is reduced by almost 1% when a cycle with two top equalization steps is used. Adding a 3rd equalization step can help minimize stability of process variation, and maintain a lower switch loss compared with the one-equalization step cycle. Overall it has been found that two or more equalization steps help the RCPSA process to achieve a low switch loss target of 2% or less, or at least less than 3%.

TABLE 2

| Bed No. | 1 | 2 | 2 |
|---|---|---|---|
| Test conditions | Low Velocity Breakthrough test conditions | Low Velocity Breakthrough test conditions | High velocity Breakthrough test conditions |
| Size (diameter or thickness), (mm) | 2 | 0.162 | 0.162 |
| Test Gas Average $CO_2$ concentration (ppm) | 450 | 10000 | 450 |
| Flow rate (v) (m/s) | 0.14 | 0.04 | 2 |
| P (bar) | 1.4 | 1.4 | 1.4 |
| $D_L$ (m$^2$/s) | 1.95E-04 | 1.44E-05 | 2.04E-03 |
| $MTC_{DL}$ (1/s) | 63 | 69 | 897 |
| $MTC_{DP}$ (1/s) | 58 | 8840 | 8840 |
| $MTC_{tot}$ (1/s) | 30 | 69 | 814.5 |
| Expected MTC for beads of 0.162 mm diameter ($MTC_{DS1}$) (1/s) | 0.003 | 0.03 | 0.08 |
| Experimental Best Fit Value ($MTC_{DS2}$) (1/s) | 0.003 | 0.1 | 0.15 |
| $MTC_{DS2}/MTC_{DS1}$ (Ratio of experimental best fit value/expected value) | n/a | 3.1 | 1.9 |

Process Examples 1a and 1b and Comparative Process Example 1

A simulation was performed using the overall LDF mass transfer coefficients (KS) from Table 2 based on best-fit test data (KS=0.15 1/s ($MTC_{DS2}$)) as well as the calculated expected value for the same size beads (KS=0.08 1/s) ($MTC_{DS1}$)).

Figure 4:
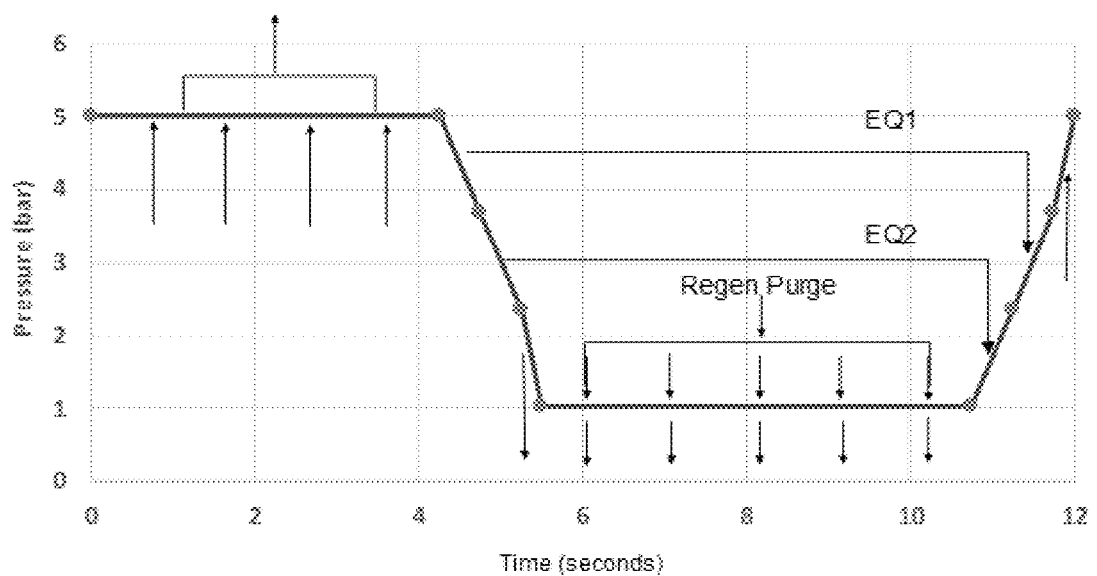
FIG. 4 is a graph depicting a pre-purification cycle with two pressure equalization steps.

The bed layering included 25% of AA laminate (corresponding to Comparative Laminate 2c) followed by 75% of 80% AA/20%13X composite laminate (corresponding to Composite Laminate Example 2a). Both laminate layers were ~0.16 mm in thickness and the flow channel was a 304 SS stainless steel wire mesh of ~0.16 mm in thickness. A constant solid film mass transfer coefficient of 0.15 1/s was used to match the performance test results ($MTC_{DS2}$), and 0.08 1/s was used as the expected MTC ($MTC_{DS1}$) based on the calculation for 0.162 mm diameter adsorbent beads in Table 2. A pre-purification cycle having two pressure equalization steps (FIG. 4) was used in the simulation.

Figure 5:
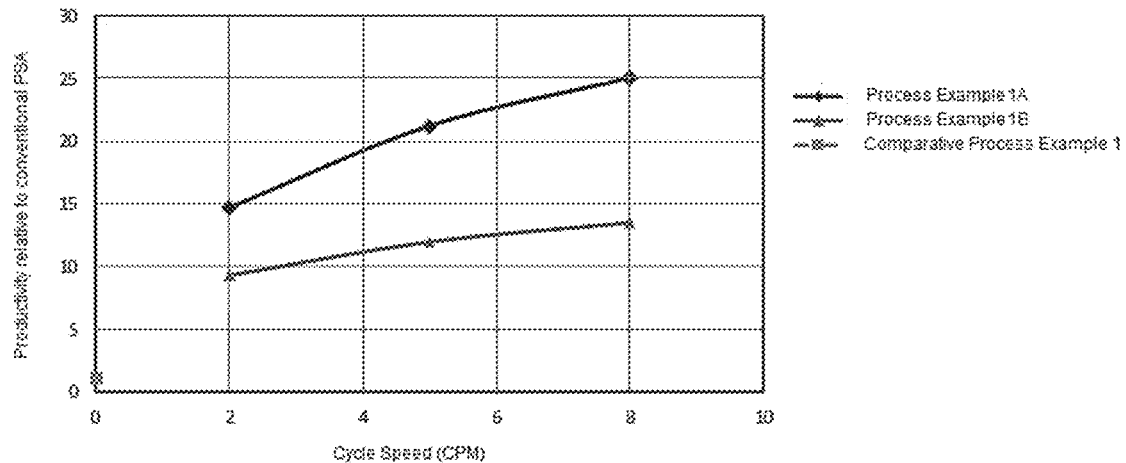
FIG. 5 is a graph depicting the effect of cycle time on productivity for RCPSA processes according to the first aspect of the present disclosure and also conventional PSA processes.

Cycle speed sensitivities from 2 to 20 CPM were tested corresponding to total cycle times in the range of from 3-30 seconds at a feed pressure of 6.0 bara, a feed temperature of 30° C., and a purge to feed ratio of 50%. FIG. 5 shows the results for cycle speeds in the range of from 2-8 CPM. It can be seen that for both RCPSA cases using the expected (Process Example 1A) and actual mass transfer coefficients (Process Example 1B), the productivity is greatly increased compared with a conventional PSA process (Comparative Process Example 1). The laminate RCPSA absorbent beds can process 58%-85% more air than a RCPSA device with an expected MTC the same as that of fine adsorbent beads.

Process Example 2

Simulations were performed for an all alumina bed to evaluate different cycles at a constant cycle speed of 5 CPM.

Comparative Process Examples 2A and 2B

Long cycle PSA testing was conducted on a 2-bed PSA unit (0.2 m diameter, 2 m length). The total cycle time was 36 minutes (18 minutes on feed, 14 minutes on depressurization and purge and 4 minutes idle). The water-saturated air feed temperature was 25° C. and feed pressure was 7 bar.

The adsorbents screened were a bed of activated alumina (2 mm A300 activated alumina) a bed consisting of 85% by volume 2 mm A300 activated alumina at the feed end of the bed and 15% by volume 2 mm 13X beads (UOP 13X). The PSA cycles were run to a time averaged $CO_2$ breakthrough concentration of 50 ppb with an inlet concentration of 400 ppm ($CO_2$ breakthrough extent of 0.0125% (50 ppb/400 ppm) or $CO_2$ removal extent of 99.99%). This level of $CO_2$ breakthrough is typical for air separation plants to avoid $CO_2$ freezing out in the liquid oxygen section of the plant. The water content in the feed was 4500 ppm and the exit concentration was undetected at an exit $CO_2$ concentration of 50 ppb suggesting essentially 100% water removal at that level of $CO_2$ breakthrough for all tests conducted.

The tests were also conducted to determine the efficiency of the PSA to remove other air impurities, in particular $N_2O$ and $C_2H_4$. Both $N_2O$ and $C_2H_4$ can cause safety problems for an air separation plant as these impurities will concentrate in liquid oxygen leading to possible explosive conditions. Therefore, an air pre-purification process that removes all the inlet air concentrations of $N_2O$ and $C_2H_4$ will be inherently safer to operate and preferred. The level of $N_2O$ present in the ambient air is about 330 ppb and the level of time-averaged $N_2O$ breakthrough was determined at a time-averaged breakthrough level of 50 ppb $CO_2$. The extent of $C_2H_4$ breakthrough was also tested by injecting 1 ppm $C_2H_4$ into the air feed to the PSA and measuring the time-averaged $C_2H_4$ breakthrough level at 50 ppb $CO_2$.

The results of this testing are shown in Table 3 below:

TABLE 3

| Example | Adsorbent | $N_2O$ in (ppb) | $N_2O$ out (ppb) | $N_2O$ removal (%) | $C_2H_4$ in (ppm) | $C_2H_4$ out (ppm) | $C_2H_4$ removal (%) |
|---|---|---|---|---|---|---|---|
| Comparative Process Example 2A | Alumina | 330 | 228 | 31 | 1 | 0.32 | 68 |
| Comparative Process Example 2B | Alumina/13X beads | 330 | 56 | 83 | 1 | 0.02 | 98 |

Figure 8:
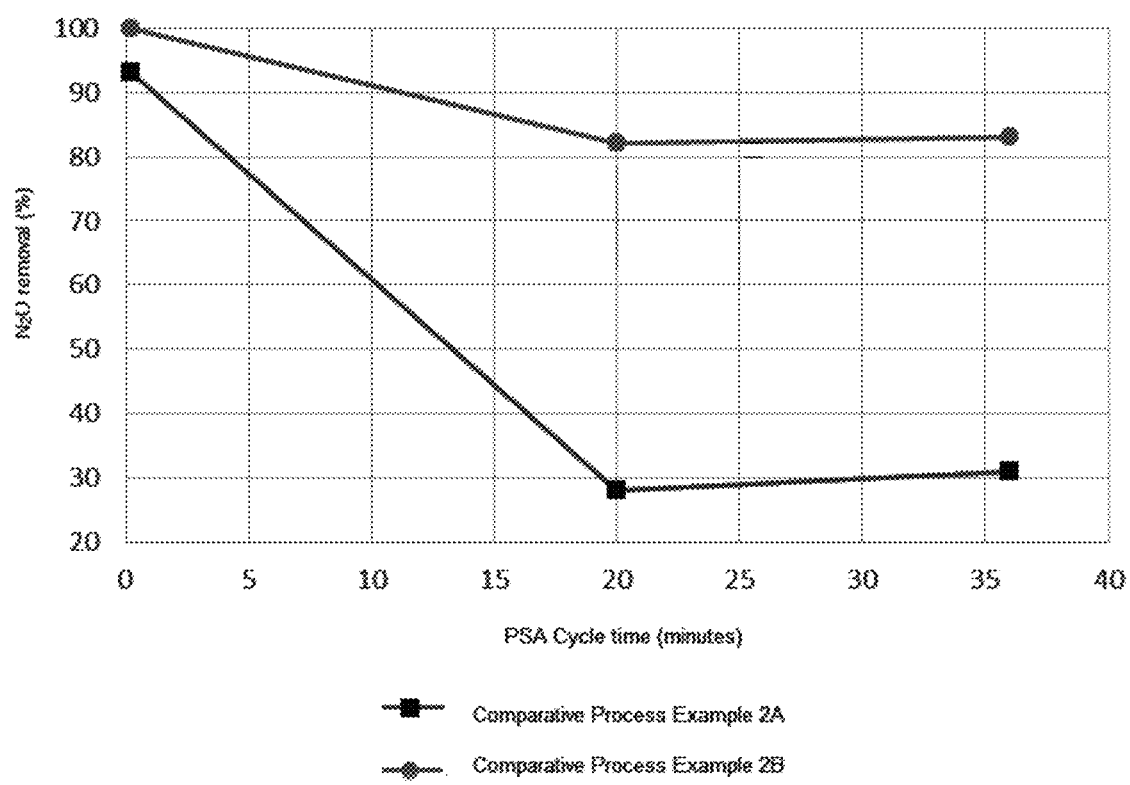
FIG. 8 is a graph depicting the effect of cycle time on percentage $N_2O$ removal in long cycle PSA for an activated alumina bed and an AA/13X composite bed.

The graph in FIG. 8 shows that as cycle time is decreased from 36 to 20 minutes, there is essentially no change in the amount of $N_2O$ removal for either bed configuration. Thus, long cycle PSA processes do show any improvement in $N_2O$ removal when the cycle time is decreased.

Process Examples 3-6

A RCPSA performance test was conducted to evaluate four different laminate bed configurations: all AA (short), AA (long), AA+13X two-layer bed, and AA+ Composite laminate two-layered bed. All laminate sheets/beds were of similar thickness and the flow channels were of similar height. Details of the bed configurations and results of the performance tests are summarized in Table 4.

All tests used atmospheric air compressed to required pressure. Feed pressures between 71-74 psig (4.9 to 5.1 bar) were tested. However, feed pressures in the range of 3-20 bar can be well suited for the RCPSA process. The feed was re-hydrated to >90% relative humidity before entering RCPSA beds. All test runs reached steady state with product $CO_2$ concentration of ~50 ppb.

It was found that the all AA bed configuration is capable of removing more than 90% of feed $N_2O$, 100% of $C_2H_2$ and more than 97% of $C_2H_4$ in the feed (Process Example 3). The bed configuration with either a 13X bed layer (Process Example 5) or a Composite AA-13X layer (Process Example 6) achieved 100% removal for both $N_2O$ and hydrocarbons in the feed. In all cases tested, the contact time for the feed step was less than 1 second.

It is also shown in Table 4 that the composite bed performs best in producing the highest productivity at less than ~50% purge to air ratio. The productivity (VVH) is defined as the $Nm^3$ of air processed/hr/$m^3$ of the total bed volume of the system. The two layered AA+13X bed (Process Example 5) processed more air than the all AA bed (Process Example 3) at the expense of higher purge ratio (66% vs 50%). Since the higher purge ratio cannot be obtained in most air separation plants, a purge ratio of 30-50% is preferred.

Similarly to any other PSA applications, the RCPSA process will work well for various climate conditions, for example feed temperatures in the range of about 0 to about 50° C. The results suggest that a longer test bed (Process Example 4) increases bed pressure drop for both feed and regeneration steps, although achieving similar air purity and productivity. Higher pressure drop increases air compression power consumption. Therefore our desired range of RCPSA bed height from about 0.15 m to about 0.61 m (about 6 to about 24 inches), most preferably from about 0.25 m 0.38 m (about 10 to about 15 inches). The pressure drop in the purge or regeneration step is preferably less than about 34.5 kPa, more preferably less than about 13.8 kPa.

TABLE 4

| Example | Process Example 3 | Process Example 4 | Process Example 5 | Process Example 6 |
|---|---|---|---|---|
| Bed Configuration | All Alumina Bed | All Alumina Bed | AA + 13X Layered Bed | AA + Composite Layered Bed |
| Feed End First Layer Material | Activated alumina (Comparative Laminate 2c) | Activated alumina (Comparative Laminate 2c) | Activated alumina (Comparative Laminate 2c) | Activated alumina (Comparative Laminate 2c) |
| First Layer Height (m) | 0.3048 | 0.381 | 0.1524 | 0.0762 |
| First Layer Laminate Thickness (mm) | 0.16 | 0.16 | 0.16 | 0.16 |
| Second Layer Material | n/a | n/a | 13X (Laminate Example 1b) | Composite 80% AA/20% 13X (Laminate Example 1b) |
| Second Layer Height (m) | n/a | n/a | 0.1524 | 0.2286 |
| Second Layer Laminate Thickness (mm) | n/a | n/a | 0.16 | 0.16 |
| Test Feed Pressure (barg) | 4.9 | 5.1 | 4.9 | 4.9 |
| Test Feed Temperature (° C.) | 20 | 20 | 20 | 20 |
| Purge Outlet Pressure (barg) | 0.0345 | 0.138 | 0.172 | 0.172 |
| Purge Inlet Temperature (° C.) | 20 | 20 | 20 | 20 |
| Cycle Speed (CPM) | 5 | 5 | 5 | 5 |
| Cycle Type | One-Equalization | One-Equalization | One-Equalization | One-Equalization |

TABLE 4-continued

| Example | Process Example 3 | Process Example 4 | Process Example 5 | Process Example 6 |
|---|---|---|---|---|
| Feed Step Bed DP (kPa) | 6.89 | 13.8 | 17.23 | 12.41 |
| Purge Step Bed DP (kPa) | 8.96 | 20.68 | 27.58 | 13.79 |
| Air Productivity (VVH) | 11669 | 12490 | 21001 | 21660 |
| Purge to Air Ratio (%) | 50 | 52 | 66 | 49 |
| Feed Air $CO_2$ Concentration (ppm) | ~450 | ~470 | ~450 | ~450 |
| Feed Air $N_2O$ Concentration (ppb) | ~360 | ~360 | ~360 | ~360 |
| Feed Air $C_2H_2$ Concentration (ppm) | 6.6 | | 6.6 | 6.6 |
| Feed Air $C_2H_4$ Concentration (ppm) | 6.4 | | 6.4 | 6.4 |
| Feed Air relative humidity (%) | 97 | 97 | 97 | 97 |
| Treated Air $H_2O$ Concentration (ppb) | 0 | 0 | 0 | 0 |
| Treated Air $CO_2$ Concentration (ppb) | 40 | 60 | 50 | 50 |
| Treated Air $N_2O$ Concentration (ppb) | 25 | 23 | N.D. | N.D. |
| Treated Air $C_2H_2$ Concentration (ppm) | N.D. | | N.D. | N.D. |
| Treated Air $C_2H_4$ Concentration (ppm) | 0.2 | | N.D. | N.D. |
| Treated Air $H_2O$ removal ratio (%) | 100 | 100 | 100 | 100 |
| Treated Air $N_2O$ removal ratio (%) | 93 | 94 | 100 | 100 |
| Treated Air $C_2H_2$ removal ratio (%) | 100 | | 100 | 100 |
| Treated Air $C_2H_4$ removal ratio (%) | 97 | | 100 | 100 |

N.D. = non detectable

Process Examples 7-9

A RCPSA performance test was conducted to evaluate hydrocarbon removal by composite laminate beds. All tests used atmospheric air compressed to required pressure. The feed was then re-hydrated to >90% relative humidity before entering the RCPSA beds. Hydrocarbons of acetylene and ethylene gases were injected and mixed with the feed air. All of the test runs reached steady state when the product $CO_2$ and hydrocarbon concentrations were stabilized.

As can be seen from the data in Table 5, the composite bed completely removed hydrocarbons (C2+) at an average $CO_2$ breakthrough concentration of 100 ppb or less.

TABLE 5

| Example | Process Example 7 | Process Example 8 | Process Example 9 |
|---|---|---|---|
| Bed Configuration | Layer 1: 3" AA (Comparative Laminate 2c) Layer 2: 9" Composite (60% AA/40% 13X) (Composite Example 2b) | | |
| Test Feed Pressure (barg) | 4.9 | 4.9 | 4.9 |
| Test Feed Temperature (° C.) | 30 | 30 | 30 |
| Cycle Speed (CPM) | 5 | 5 | 5 |
| Air Productivity (VVH) | 15200 | 22700 | 29600 |
| Purge to Air Ratio (%) | 50 | 50 | 50 |
| Feed Air $CO_2$ Concentration (ppm) | 440 | 430 | 510 |
| Feed Air $N_2O$ Concentration (ppb) | 360 | 360 | 360 |
| Feed Air $C_2H_2$ Concentration (ppm) | 5.8 | 4.2 | 3.6 |
| Feed Air $C_2H_4$ Concentration (ppm) | 5.5 | 4 | 3.5 |
| Treated Air $CO_2$ Concentration (ppb) | N.D. | ~10 | 300 |
| Treated Air $N_2O$ Concentration (ppb) | N.D. | N.D. | N.D. |
| Treated Air $C_2H_2$ Concentration (ppb) | N.D. | N.D. | <50 |
| Treated Air $C_2H_4$ Concentration (ppb) | N.D. | N.D. | ~100 |
| $N_2O$ Removal Ratio (%) | 100 | 100 | 100 |
| $C_2H_2$ Removal Ratio (%) | 100 | 100 | 99 |
| $C_2H_4$ Removal Ratio (%) | 100 | 100 | 98 |

N.D. = non detectable

Process Examples 10 and 11

A RCPSA performance test was conducted to evaluate NaY zeolite material as an alternative to 13X. The test bed configuration contained 3" activated alumina laminate followed by 9" composite laminate of 50 wt % activated Alumina and 50 wt % NaY zeolite. All tests used atmospheric air compressed to required pressure. The feed was then re-hydrated to over 90% relative humidity before entering the RCPSA beds. Hydrocarbons of acetylene and ethylene gases were injected and mixed with the feed air. All of the test runs reached steady state when the product $CO_2$, $N_2O$ and hydrocarbon concentrations were stabilized.

As can be seen from the data in Table 6, the AA-NaY composite laminate is capable of completely removing $N_2O$ and hydrocarbons (C2s and C3+) at $CO_2$ average breakthrough concentration of 50 ppb. Zeolites other than 13X (NaX) and NaY, such as NaLSX, A, chabazite and silicalite may also be utilized as a single layer or in a layer of composite laminate (AA-zeolite mixture) in the air pre-purification RCPSA process according to the present disclosure. Other possible adsorbents include metal organic framework structures, activated carbon, clays, pillared clays and any adsorbent impregnated with basic compounds.

TABLE 6

| Example | Process Example 10 | Process Example 11 |
|---|---|---|
| Bed Configuration | Layer 1: 3" AA (Comparative Laminate 2c) Layer 2: 9" Composite (50% AA/50% NaY) (Composite Example 4) | |
| Test Feed Pressure (barg) | 4.9 | 4.9 |
| Test Feed Temperature (° C.) | 32 | 32 |
| Purge Outlet Pressure (barg) | 0.0345 | 0.0345 |
| Purge Inlet Temperature (° C.) | 32 | 32 |
| Cycle Speed (CPM) | 3 | 3 |
| Cycle Type | Two-Equalization | Two-Equalization |
| Regen to Air Ratio (%) | 50.0 | 40.5 |
| Feed $CO_2$ (ppm) | 420 | 420 |
| Feed Relative Humidity (%) | 97.0 | 97.0 |
| Feed Air $CO_2$ Concentration (ppm) | 420 | 420 |
| Feed Air $N_2O$ Concentration (ppb) | 360 | 360 |
| Feed Air $C_2H_2$ Concentration (ppm) | 6.6 | 6.6 |
| Feed Air $C_2H_4$ Concentration (ppm) | 6.4 | 6.4 |
| Treated Air $CO_2$ Concentration (ppb) | 50 | 50 |
| Treated Air $N_2O$ Concentration (ppb) | N.D. | N.D. |
| Treated Air $C_2H_2$ Concentration (ppm) | N.D. | N.D. |
| Treated Air $C_2H_4$ Concentration (ppm) | N.D. | N.D. |
| $N_2O$ Removal Ratio (%) | 100 | 100 |
| $C_2H_2$ Removal Ratio (%) | 100 | 100 |
| $C_2H_4$ Removal Ratio (%) | 100 | 100 |
| Air Productivity (VVH) | 16900 | 13500 |
| Purge to Air Ratio (%) | 50.0 | 40.5 |

N.D. = non detectable

Figure 9:
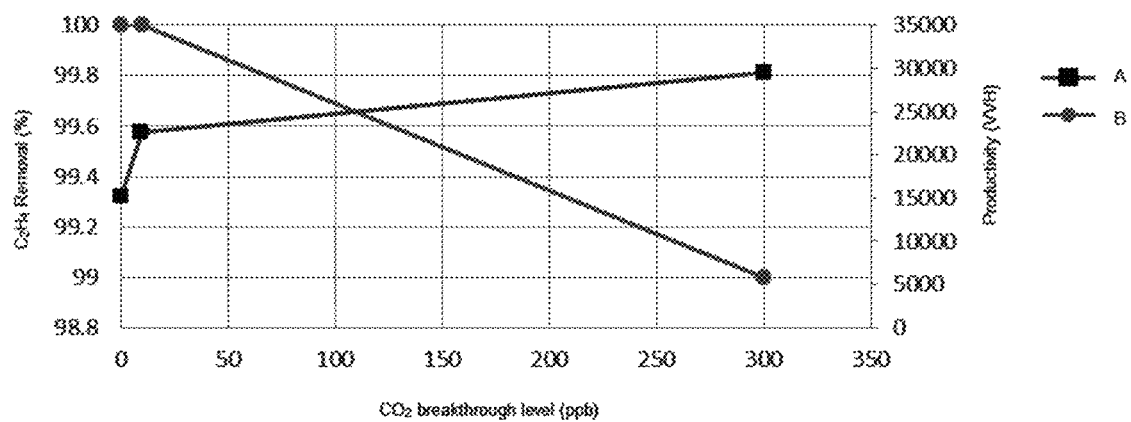
FIG. 9 is a graph depicting the variation of productivity and $C_2H_2$ removal with outlet $CO_2$ concentration ($CO_2$ breakthrough).

FIG. 9 shows the productivity of a 2-equalization step cycle with an AA/composite bed as described in Table 6 as a function of $CO_2$ breakthrough level (A). The plot also shows the $C_2H_2$ removal as a function of $CO_2$ breakthrough level (B).

In an air pre-purification unit, the removal of $C_2H_2$ must be 100% owing to its very low solubility in liquid oxygen and its propensity for violent reaction. It can be seen from FIG. 9 that as you go from undetectable levels of $CO_2$ to 10 ppb $CO_2$, the $C_2H_2$ removal remains at 100%. So, both cycles could be used for safe operation. However, as the $CO_2$ in the effluent is increased from 0 to 10 ppb, the productivity of the system increases by 50% which is a desirable result. Once the $CO_2$ breakthrough level is increased to 300 ppb, the productivity increases by another 30%, but the feed rate is too high resulting in breakthrough of a key impurity. Thus, at a $CO_2$ breakthrough level of 0 ppb, the plant is safe, but runs at low productivity. Once the breakthrough level is increased to 10 ppb, the productivity is increased by 50% and the plant operation is still safe. Once a breakthrough level of 300 ppb occurs, an unsafe situation occurs even though the productivity is further increased by 30%. This data therefore demonstrates that $CO_2$ Breakthrough level must be at least 10 ppb and less than 300 ppb.

Process Example 12 and Comparative Process Examples 3 and 4

As can be seen from the data in Table 7, the permeability and voidage of a composite laminate adsorbent sheet according to the present disclosure is higher than prior art laminates.

The data below in Table 7 demonstrate the significant difference in laminate and bed properties (laminate thickness, bed voidage, bed permeability and resulted productivity) between front end pre-purification process compared with refinery off-gas H2 recovery and purification of steam methane reforming (SMR) synthesis gas (typically 75% $H_2$ balance impurities (CO, $CO_2$ and $CH_4$). This data shows that although these processes all use laminate beds, it is not obvious since using the same laminate and process design work in pre-purification process.

TABLE 7

| | Process Example 12 | Comparative Process Example 3 | Comparative Process Example 4 |
|---|---|---|---|
| Application | Front End Pre-purification of air | Refinery Off-Gas $H_2$ recovery | Purification of SMR synthesis gas |
| VVH | 25000 (Air) | 9000 ($H_2$) | 2800 ($H_2$) |
| Cycle Speed (CPM) | 5 | 30 | 7 |
| Main Adsorbent | Layer 1: AA/13X Composite (Laminate 2b) Layer 2: Activated alumina (Comparative Laminate 2c) | Activated Carbon | Zeolites |
| Laminate Thickness (m) | 0.00016 | 0.00025 | 0.00027 |
| Spacer Thickness (m) | 0.00022 | 0.00015 | 0.00015 |
| Main Layer Voidage | 0.58-0.63 | 0.35-0.38 | 0.35-0.38 |
| Permeability (Darcy Number) | >700 | 350 | 350 |

The Darcy number is calculated according to the following equation $$K=(Q\times\mu\times L)/(\Delta P\times A\times 9.87e-13)$$

Where:
K=Bed/Segment permeability—Unit: Darcy (9.87e−13 $m^2$)
Q=Volumetric flow rate—Unit: $m^3/s$ (at SATP)
μ=Dynamic viscosity—Unit: Pa·s
L=Test section length—Unit: metre
ΔP=Segment pressure drop—Unit: Pa
A=Test section surface area—Unit: $m^2$ Process Examples 13A and 13B and Comparative Process Examples 5 and 6

The data in Table 8 below shows that the productivity and $N_2O$ removal level of a standard long cycle PSA process and the RCPSA process of the current disclosure. The RCPSA process leads to both large increases in productivity (14.7 to 27.2 times) as well as increased $N_2O$ removal (17-62%) (Process Examples 13A and 13B).

The improvement in $N_2O$ removal observed with the RCPSA process of the present disclosure is unexpected, using the same adsorbent material. In addition, the RCPSA process of the present results in improved productivity and the use of a composite laminate according to the present resulted in an unexpectedly higher increase ratio in productivity. In the conventional long cycle PSA, the productivity observed with both an alumina and an alumina/13X composite bed was the same. However, the RCPSA process according to the present, the productivity was 1.9 times higher for the alumina/13X composite bed configuration than for the all alumina bed.

TABLE 8

| Example | Adsorbent | Cycle time (min) | N₂O Removal (%) | Productivity (VVH) | Improvement in N₂O removal relative to normal cycle PSA (%) | Improvement in Productivity relative to normal cycle PSA |
|---|---|---|---|---|---|---|
| Comparative Process Example 6 | Alumina Beads | 36 | 31 | 796 | — | — |
| Process Example 14A | Alumina Laminate | 0.2 | 93 | 11669 | 62 | 14.7 times |
| Comparative Process Example 7 | Alumina/13X Composite beads | 36 | 83 | 796 | — | — |
| Process Example 14B | Alumina/13X Composite laminate | 0.2 | 100 | 21660 | 17 | 27.2 times |

Process Examples 14 to 18 and Comparative Process Examples 7 to 10

The data in Table 9 demonstrates the process intensification obtained for an RCPSA process using an adsorbent laminate according to the present disclosure in accordance with one or more embodiments in comparison with the beaded adsorbents of the existing art. This includes cycle time, productivity and contact time.

TABLE 9

| | Comparative Process Example 7 | Comparative Process Example 8 | Comparative Process Example 9 | Comparative Process Example 10 | Process Example 14 | Process Example 15 | Process Example 16 | Process Example 17 | Process Example 18 |
|---|---|---|---|---|---|---|---|---|---|
| Description | Beaded beds PSA | Beaded beds PSA | Beaded beds PSA | Beaded beds TEPSA | Laminate RCPSA | Laminate RCPSA | Laminate RCPSA | Laminate RCPSA | Laminate RCPSA |
| Cycle | 2-Bed | 2-Bed | 2-Bed | 2-Bed | 12-Bed | 12-Bed | 12-Bed | 12-Bed | 12-Bed |
| Total Cycle Time (min) | 28 | 28 | 28 | 64 | 0.2 | 0.2 | 0.2 | 0.2 | 0.2 |
| P Feed (bara) | 5.2 | 10 | 6 | 5.2 | 5.7 | 5.7 | 5.7 | 5.7 | 5.7 |
| Feed Temperature (° C.) | 40 | 30 | 30 | 40 | 30 | 30 | 30 | 30 | 40 |
| Cycle Speed (CPM) | 0.0357 | 0.0357 | 0.0357 | 0.0156 | 5.0 | 5.0 | 5.0 | 5.0 | 5.0 |
| P/A ratio | 0.50 | 0.16 | 0.45 | 0.50 | 0.50 | 0.50 | 0.50 | 0.50 | 0.50 |
| Productivity (V/V/H) | 578 | 1090 | 747 | 770 | 11,669 | 12,490 | 21,001 | 21,660 | 25004 |
| Air Switch Loss (%) | 1.55 | 1.86 | 1.48 | 0.42 | 3.2 | 3.0 | 2.0 | 2.0 | 1.5 |
| Product impurity (ppb CO—) | <50 | <50 | <50 | <50 | <50 | <50 | <50 | <50 | <50 |
| Calculated Residence Time (sec) | 14.0 | 14.7 | 12.9 | 10.5 | 0.65 | 0.61 | 0.36 | 0.35 | 0.29 |

By employing a laminate composite adsorbent according to third the present (Process Examples 14-18) which a much higher mass transfer rate as well as reduced pressure drop compared with conventional beaded adsorbents, enhancement in the process performance is achieved. Compared with conventional beaded adsorbent PSA processes (Comparative Process Examples 7-10), the cycle time is shortened from 28 minutes to 0.2 seconds. The contact time during the feed step is reduced from more than 10 seconds to less than 0.5 seconds. The productivity enhancement is more than 10 times, as high as 30 times. This results a much less adsorbent volume and size of the adsorber vessels (<10%) for the RCPSA process.

While the present disclosure has been described with reference to the preferred embodiments depicted in the figures, it will be appreciated that various modifications are possible within the spirit or scope of the invention as defined by the following claims. All prior teachings above are hereby incorporated herein by reference.

The invention claimed is:

1. A process for separating air by cryogenic distillation, said process comprising the steps of:
   (i) passing a feed air stream through at least one rapid cycle pressure swing adsorption (RCPSA) device to remove at least one impurity selected from the group consisting of $H_2O$, $CO_2$, $N_2O$, and one or more hydrocarbons from said feed air stream to produce purified air; and
   (ii) feeding said purified air through a cryogenic distillation column system to separate said purified air into oxygen and/or nitrogen products;
   wherein said process has a cycle time from 0.3 to 60 seconds.

2. The process according to claim 1, wherein said process has a cycle time from 0.3 to 30 seconds.

3. The process according to claim 1, wherein said process has a cycle time from 0.3 to 15 seconds.

4. The process according to claim 1, wherein said process has a contact time on feed of about 1 second or less.

5. The process according to claim 1, wherein said process comprises at least two pressure equalization steps per cycle.

6. The process according to claim 1, wherein said feed air stream comprises $H_2O$, $CO_2$ and $N_2O$ impurities, and wherein said process removes said $H_2O$, $CO_2$ and $N_2O$ impurities from said feed air stream.

7. The process according to claim 1, wherein said feed air stream comprises $H_2O$ and $CO_2$ impurities, and wherein said process removes at least 99% of said $H_2O$ and $CO_2$ impurities from said feed air stream.

8. The process according to claim 1, wherein said feed air stream comprises $N_2O$, and wherein said process removes at least 90% of $N_2O$ from said feed air stream.

9. The process according to claim 1, wherein said feed air stream comprises one or more hydrocarbons and at least one of $H_2O$, $CO_2$ and $N_2O$, and wherein said process removes said one or more hydrocarbons and at least one of $H_2O$, $CO_2$ and $N_2O$ from said feed air stream.

10. The process according to claim 1, wherein said one or more hydrocarbons comprise at least one of $C_2H_2$ and $C_2H_4$.

11. The process according to claim 1, wherein said process provides a $CO_2$ breakthrough level of at least about 10 ppb.

12. The process according to claim 1, wherein said feed air stream has a linear velocity of at least about 2 m/s.

* * * * *